US 8,452,650 B2

(12) United States Patent
Paunikar et al.

(10) Patent No.: US 8,452,650 B2
(45) Date of Patent: May 28, 2013

(54) DYNAMIC PRICING FOR CONTENT PRESENTATIONS

(75) Inventors: Amit Paunikar, Los Angeles, CA (US); Michael Hochberg, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/359,926

(22) Filed: Jan. 27, 2012

(65) Prior Publication Data

US 2012/0123856 A1 May 17, 2012

Related U.S. Application Data

(63) Continuation of application No. 12/259,937, filed on Oct. 28, 2008.

(60) Provisional application No. 61/093,257, filed on Aug. 29, 2008.

(51) Int. Cl.
*G06Q 30/00* (2012.01)

(52) U.S. Cl.
USPC .......................................... 705/14.1

(58) Field of Classification Search
USPC .......................................... 705/14.1
See application file for complete search history.

(56) References Cited

U.S. PATENT DOCUMENTS

| 2006/0122879 A1 | 6/2006 | O Kelley |
| 2007/0288953 A1* | 12/2007 | Sheeman et al. ................. 725/34 |
| 2008/0103903 A1 | 5/2008 | Flake et al. |
| 2008/0262917 A1 | 10/2008 | Green et al. |

FOREIGN PATENT DOCUMENTS

| KR | 10-0849041 B1 | 7/2008 |
| WO | WO0057333 A2 | 9/2000 |

OTHER PUBLICATIONS

PCT International Search Report and the Written Opinion, PCT/US2009/054954, Mar. 31, 2010, 12 pages.
PCT International Preliminary Report on Patentability, PCT/US2009/054954, Mar. 1, 2011, 7 pages.

* cited by examiner

*Primary Examiner* — Daniel Lastra
(74) *Attorney, Agent, or Firm* — Fish & Richardson P.C.

(57) ABSTRACT

A request for content is received. First content is selected for the request. The first content is selected from among multiple content items based on information in the request, a characteristic of how the first content is to be presented, and a stored pricing threshold value selected based on the characteristic. The characteristic of how the first content is to be presented includes an amount of available space that is occupied by the first content when the first content is presented. The selected first content is provided for presentation by a publisher that provides second content.

26 Claims, 9 Drawing Sheets

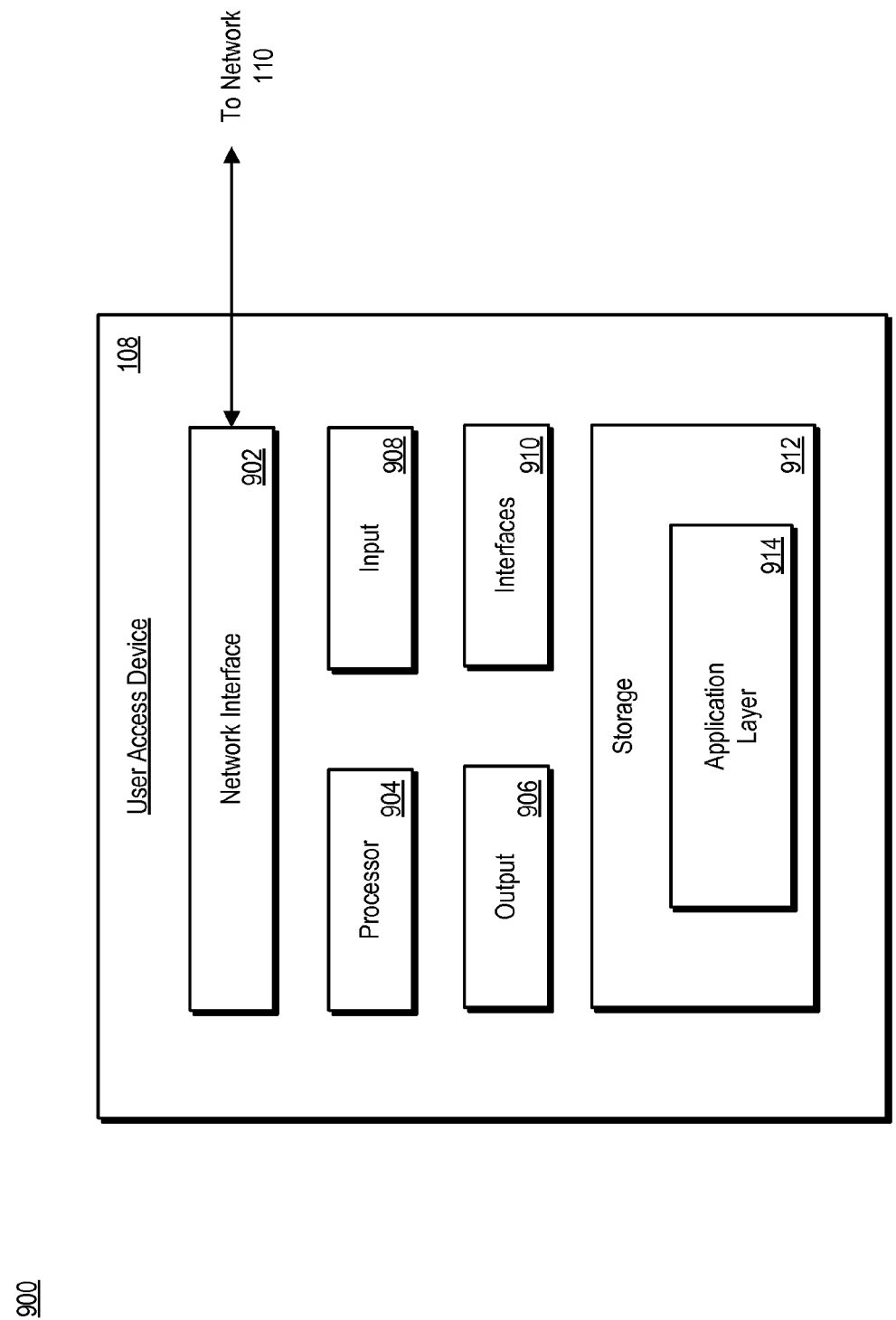

DYNAMIC PRICING FOR CONTENT PRESENTATIONS

CROSS-REFERENCE TO RELATED APPLICATION

This application is a continuation application of, and claims priority to, U.S. patent application Ser. No. 12/259,937, entitled "Dynamic Pricing for Content Presentations," to inventors Amit Paunikar and Michael Hochberg, which was filed on Oct. 28, 2008, which claims priority to U.S. Provisional Patent Application Ser. No. 61/093,257, filed Aug. 29, 2008, and entitled "Dynamic Pricing for Content Presentations." The disclosures of the foregoing applications are incorporated herein by reference in their entirety.

BACKGROUND

Interactive media, such as the Internet, can provide powerful advertising tools. Indeed, advertisers can use the Internet to access various audiences interested in available products and services.

Some forms of interactive media advertising involve delivering advertisements ("ads") to users based on various criteria. For example, ads can be presented in a web site based on the content of the web site. The ads may drive online consumers to web sites associated with providers of products and/or services.

Interactive media advertising systems can utilize various pricing policies for ads. In some systems, an advertiser can select a particular pricing policy for use with an ad or ad campaign. As an example, advertisers can be charged for ads on a cost-per-click (CPC) basis. With this policy, advertisers can bid for ads by entering a CPC bid. As another example, advertisers can be charged for ads on a cost per thousand impressions (CPM) basis. In this case, advertisers can bid on a CPM. Publishers can receive revenue for allowing advertisements to be displayed with their content (e.g., on a particular web page). This publisher revenue can vary based on the terms of the pricing policy used for advertisements. Publishers, however, may wish to have some assurance that they will receive a certain revenue stream.

SUMMARY

In general, in one aspect, a computer-implemented method of providing content comprises: receiving a request for content; selecting first content for the request from among multiple content items based on: 1) information in the request, 2) a characteristic of how the first content is to be presented, the characteristic including an amount of available space that is occupied by the first content when the first content is presented, and 3) a stored pricing threshold value that is selected based on the characteristic of how the first content is to be presented; and providing the selected first content for presentation by a publisher that provides second content.

In another general aspect, a computer-implemented method of providing content comprises: receiving a request for content; identifying, based on information in the received request, first content to be presented by a publisher providing second content; accessing a stored bid associated with the identified first content, the bid representing a maximum price to be paid associated with the first content; determining a characteristic of how the first content is to be presented; selecting, based on the determined characteristic, a stored pricing threshold value representing a minimum price for activating content; determining, based on the bid, whether the identified first content satisfies the selected pricing threshold value; and upon determining that the identified first content satisfies the selected pricing threshold value, providing the identified first content for presentation by the publisher.

In another general aspect, a system comprises: means for receiving a request for content; means for identifying, based on information in the received request, first content to be presented by a publisher providing second content; means for accessing a stored bid associated with the identified first content, the bid representing a maximum price to be paid associated with the first content; means for determining a characteristic of how the first content is to be presented; means for selecting, based on the determined characteristic, a stored pricing threshold value representing a minimum price for activating content; means for determining, based on the bid, whether the identified first content satisfies the selected pricing threshold value; and means for, upon determining that the identified first content satisfies the selected pricing threshold value, providing the identified first content for presentation by the publisher.

In another general aspect, a computer readable medium storing a computer program is provided. The computer program includes instructions that, when executed, cause at least one processor to perform operations comprising: receiving a request for content; identifying, based on information in the received request, first content to be presented by a publisher providing second content; accessing a stored bid associated with the identified first content, the bid representing a maximum price to be paid associated with the first content; determining a characteristic of how the first content is to be presented; selecting, based on the determined characteristic, a stored pricing threshold value representing a minimum price for activating content; determining, based on the bid, whether the identified first content satisfies the selected pricing threshold value; and upon determining that the identified first content satisfies the selected pricing threshold value, providing the identified first content for presentation by the publisher.

In another general aspect, a system comprises: a processor; and memory, coupled to the processor. The memory includes executable instructions for performing operations comprising: receiving a request for content; identifying, based on information in the received request, first content to be presented by a publisher providing second content; accessing a stored bid associated with the identified first content, the bid representing a maximum price to be paid associated with the first content; determining a characteristic of how the first content is to be presented; selecting, based on the determined characteristic, a stored pricing threshold value representing a minimum price for activating content; determining, based on the bid, whether the identified first content satisfies the selected pricing threshold value; and upon determining that the identified first content satisfies the selected pricing threshold value, providing the identified first content for presentation by the publisher.

In another general aspect, a computer-implemented method of providing content comprises: receiving a request for content; selecting first content for the request from among multiple content items based on: 1) information in the request, 2) a characteristic of how the first content is to be presented, 3) a stored pricing threshold value that is selected based on the characteristic of how the first content is to be presented, and 4) a determination about whether a bid associated with the first content satisfies the stored pricing threshold, the bid selected from at least two different bids based on the characteristic; and providing the selected first content for presentation by a publisher that provides second content.

In some implementations, different pricing and thresholds can be enforced for content (e.g., ads) based on how the content is presented. For example, different thresholds can be dynamically applied to the same ad based on the amount of real estate the ad is occupying on a publisher web page. As the amount of occupied real-estate increases, the pricing thresholds enforced on the ad can increase. In some examples, using differential thresholds can ensure that expanded text ads adhere to the same (e.g., higher) thresholds as an image ad or other advertisement that can occupy an entire ad block. Accordingly, publisher revenues can be maintained irrespective of the type of ads shown.

The details of one or more implementations are set forth in the accompanying drawings and the description below. Other features and advantages will be apparent from the description and drawings as well as from the claims.

BRIEF DESCRIPTION OF THE DRAWINGS

FIG. 9 is a block diagram of an example configuration for a user access device.

DESCRIPTION

The following description refers to the accompanying drawings, in which, in the absence of a contrary representation, the same numbers in different drawings represent similar elements.

Figure 1:
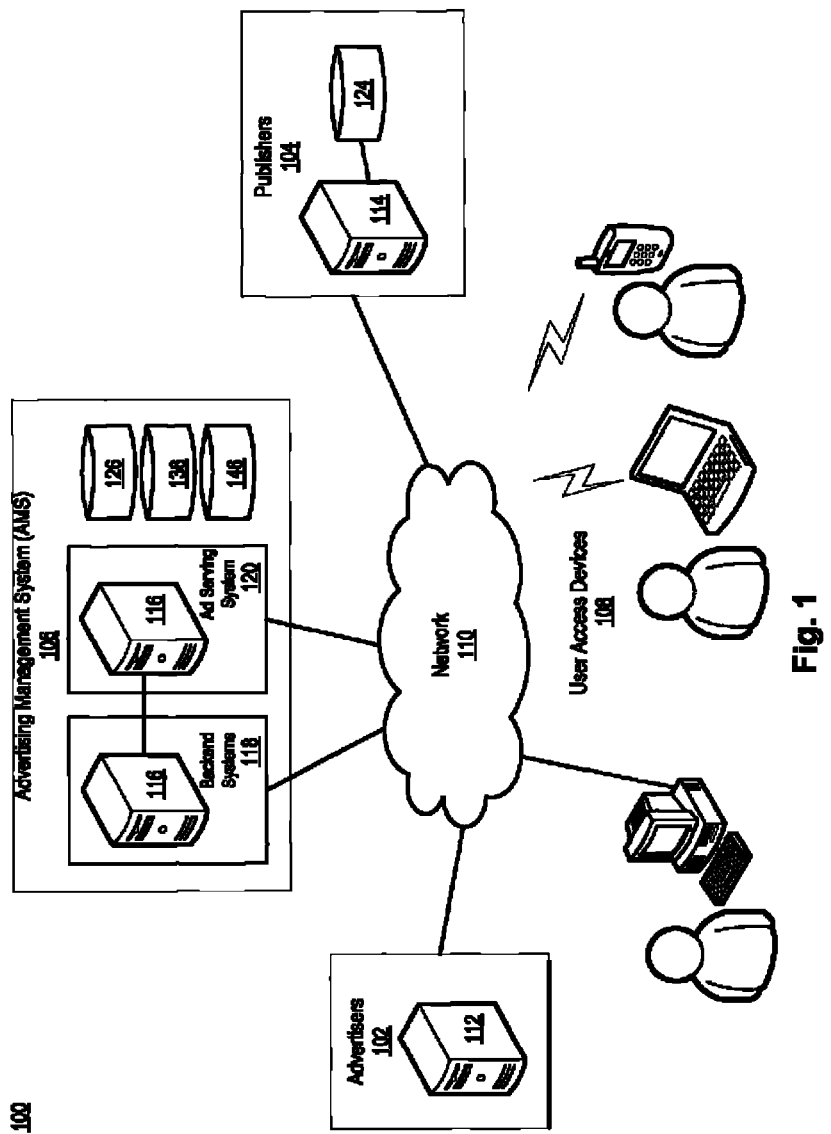
FIG. 1 is a block diagram depicting an example advertising environment.

FIG. 1 is a block diagram depicting an example content delivery environment 100. The environment 100 can receive and provide content from/to users, publishers, advertisers and the like. The content can, for example, include web documents, links, images, video, audio, advertisements, and other information. As described in detail below, in some examples, the environment 100 can receive content from advertisers and deliver or serve the advertiser content to users when the users' access content associated with publishers (e.g., a publisher web page). In some examples, the environment 100 can select and deliver advertiser content that is contextually relevant to the publisher content being accessed.

Content can include one or more advertisements. An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to or include sponsored content.

Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

The term "ad" can refer to either a single "creative" and/or an "ad group." A creative refers to any entity that represents one ad impression. An ad impression refers to any form of presentation of an ad such that it is viewable/receivable to a user. In some examples, an ad impression may occur when an ad is displayed on a display device of a user access device. An ad group refers, for example, to an entity that represents a group of creatives that share a common characteristic, such as having the same ad targeting criteria. Ad groups can be used to create an ad campaign.

In some examples, ads can be embedded within other content. For example, ads can be displayed with other content (e.g., newspaper articles) in a web page associated with a publisher. When displayed, the ads can occupy an ad space or "block." An ad space refers to any element that allows information to be rendered. In some examples, the ad space may be implemented as an HTML element, such an I-Frame (inline frame) or other type embeddable display element. The ad space can include any portion (which can include all) of a user display. The ad space can be a discrete, isolated portion of a display or it can be blended and dispersed throughout a display. The ad space can be a discrete element or it can be dispersed in multiple sub-elements.

A "click-through" of a displayed ad can occur, for example, when a user clicks or otherwise selects the ad. A "click-through rate" (CTR) can represent the number of selections (e.g., clicks) for a given number of impressions. The CTR can be determined, for example, by dividing the number of selections of the ad by the number of times the ad was served. If an ad is served 250 times and it was selected (e.g., clicked on) 5 times, for example, then the CTR would be 2 percent.

A "conversion" may occur when a user consummates a transaction related to a given ad. A conversion could be defined to occur when a user clicks on an ad, is referred to the advertiser's web page, and consummates a purchase there before leaving that web page. In another example, a conversion can be defined as the display of an ad to a user and a corresponding purchase on the advertiser's web page within a predetermined time (e.g., seven days). In another example, a conversion can involve filling in a form on an advertiser site.

The advertising environment 100 can select and serve content, including ads, according to various pricing policies and/or auction processes. For example, advertisers can submit and/or select bids for their content (e.g., ads). These bids can represent the value (e.g., a maximum price or a target price) that advertisers offer for opportunities to have their content displayed and/or selected in the environment 100. In some examples, an advertiser can specify a CPC bid for an ad, which can represent the maximum amount the advertiser is willing to pay for each click of the ad. An advertiser can bid, for example, a maximum CPC of $0.50 for a particular ad. In some examples, an advertiser can specify a CPM bid for an ad, which can represent the maximum amount the advertiser is willing to pay for each one-thousand impressions of the ad, regardless of whether the ad is actually clicked or otherwise selected by a user. An advertiser can bid, for example, a maximum CPM of $2.00 for a particular ad.

In some examples, an advertiser can specify a preferred CPC bid for an ad, which can represent a preferred or target amount (e.g., a target average cost) the advertiser wishes to pay for each click or other selection of the ad. Similarly, an advertiser can specify a preferred CPM bid for an ad, which can represent a preferred or target amount the advertiser wishes to pay for each one-thousand impressions of the ad.

When serving ads (e.g., placement targeted ads) with publisher content, the ads can be subjected to various minimum activation thresholds. These thresholds can represent a minimum amount necessary to keep content active. In some examples, the minimum activation thresholds can include minimum CPC and/or CPM bidding thresholds. That is, the activation threshold for an ad can represent the minimum bid needed to promote or serve the ad with content. An ad can satisfy the activation threshold if the bid for the ad meets or exceeds the threshold value. As an example, if the CPM activation threshold (minCPM) is $0.10 and the CPM bid is $2.00, then the ad would meet the threshold and be eligible for delivery. Thresholds are not limited to CPC and CPM bidding thresholds, and various other types of thresholds can be used, additionally or alternatively.

In some implementations, measurement metrics or scores can be calculated for ads and can be used to determine if the ads satisfy the activation threshold. The measurement metric for an ad can be calculated, for example, based on the bid (CPC or CPM), impressions, CTR, relevance, and/or other parameters. In such implementations, an ad can satisfy the activation threshold if the measurement metric meets or exceeds the threshold value. For example, if a particular ad is identified as relevant to publisher content, the measurement metric associated with that ad can be compared with the activation threshold before the ad is served with the publisher content (e.g., a web page). If the minimum threshold is not met, then the content may be declined for serving. An example measurement metric is effective cost-per-thousand impressions (eCPM), which is described in more detail below.

The environment 100 can perform differential pricing based on a rendering characteristic, such as size, of the content. Size can refer to the amount of available space (e.g., display area) occupied by the content. Thus, differential pricing can involve applying different minimum activation thresholds to content based on the amount of available space occupied by the content. For example, an ad placed with other ads within an ad space may need to satisfy a first threshold (e.g., $0.10) while the same ad, when occupying the entire ad block (or a larger portion) may need to satisfy a second higher threshold (e.g., $0.25). Size could also refer to the particular manner in which the content occupies the display area, in addition or as an alternative to how much real-estate the ad occupies. For example, size can refer to whether the ad is side-barred, bannered or otherwise displayed.

Differential pricing can involve dynamically adjusting the minimum threshold for content, for example, in real-time, when auctioning and serving the content. For example, environment 100 may automatically select and apply different thresholds to ads when the ads are being served with publisher content. Applying differential pricing can ensure publisher revenues irrespective of the type of ads being shown.

In some examples, differential pricing can be based on other rendering aspects of content, such as keywords provided in the content, intended audience, popularity of the content, and such. Several thresholds can be correlated to any one ad or rendering characteristic of the ad or other content.

The advertising environment 100 can provide differential pricing for expanded content, such as expanded text ads. For example, an advertiser can upload a text ad for presentation on a publisher web page. When presented, the text ad may occupy a portion of the available ad space on the publisher page. In some instances, the text ad can be automatically expanded (e.g., by one or more components of the environment 100) to occupy the entire available ad space. This can occur, for example, if the ad is the only ad relevant to particular publisher content. Likewise, an ad can be expanded if the ad has a higher effective cost-per-thousand impressions (eCPM) as compared to other relevant ads. For example, if the eCPM for a certain text ad is $10 and the eCPM for other relevant text and image ads is $7, then the text ad with the higher eCPM ($10) can be expanded. An ad can have a high eCPM if, for example, the ad has a high CTR (e.g., the ad is very popular) and/or has a high associated bid (e.g., $20).

Generally, the eCPM for an ad represents various factors taken over 1000 impressions of the ad. The eCPM for an ad can be calculated by multiplying the CTR by the ad's bid. For example, for a CPC ad, if the CTR is 10% and the CPC bid is $2.00, then the eCPM would be 0.10×$2.00=$0.20. This is merely an example, and the eCPM can be calculated using different formulas and/or based on additional and/or different factors, such as the relevance of an ad to publisher content.

When an ad is expanded to occupy the entire ad space, the ad may need to satisfy a minimum threshold (e.g., $0.25) that is higher than the threshold (e.g., $0.10) used when the text ad is occupying only a portion of the ad space. In some examples, the higher threshold used for an expanded text ad can be the same as a threshold used for an image ad or other ad which occupies an entire ad slot.

In some examples, differential pricing can be applied to CPC, placement targeted text ads. As noted previously, a CPC incurs a cost whenever the ad is clicked or otherwise selected. Placement targeted ads can include ads that are statically targeted based on some placement criteria. Placement targeted ads can include ads intended for a particular publisher web page. In some implementations, CPC text ads that occupy a portion of an ad block can be automatically subjected to a lower minimum threshold as compared to ads that occupy the entire ad block.

In some implementations, differential pricing can be applied to text ads that have CPM pricing and/or that are dynamically targeted to content (dynamic targeting is described in more detail below). Also, in some implementations, differential pricing thresholds can be applied to image ads (or other types of multimedia ads) that have either CPC or CPM pricing. Image ads, for example, can be made to fit a smaller ad block and thus can be priced at a lower minimum threshold than if the image ad were to occupy the entire ad slot.

In some implementations, the advertising environment 100 can dynamically determine how an ad can or should be rendered. For example, the advertising environment 100 can determine how much space a particular ad is intended to occupy. Moreover, the advertising environment 100 can determine if the ad can be expanded, shrunk, side-barred, bannered, popped up, or otherwise displayed alone or with other ads within a specific publisher's website. In some implementations, the advertising system can use ad features (e.g., title, text, links, executable code, images, audio, embedded information, targeting criteria, etc.) to identify if an ad can be served in a particular ad block.

As illustrated in FIG. 1, the advertising environment 100 may include one or more advertisers 102, one or more publishers 104, an advertising management system (AMS) 106, and one or more user access devices 108, which may be coupled to a network 110. Each of the elements 102, 104, 106, 108, and 110 in FIG. 1 may be implemented or associated with hardware components, software components, or firmware components, or any combination of such components. The elements 102, 104, 106, 108, and 110 can, for example, be implemented or associated with general purpose servers, software processes and engines, and/or various embedded systems. The elements 102, 104, 106, and 110 may serve, for example, as an ad distribution network. While reference is made to distributing advertisements, the environment 100 can be suitable for distributing other forms of content including other forms of sponsored content.

The advertisers 102 may include any entities that are associated with ads. The advertisers 102 may provide (or be otherwise associated with) products and/or services related to ads. The advertisers 102 may include or be associated with, for example, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, maintain and/or track ads, which may be related to products or services offered by or otherwise associated with the advertisers. The advertisers 102 may include or maintain one or more data processing systems 112, such as servers or embedded systems, coupled to the network 110. The advertisers 102 may include or maintain one or more processes that run on one or more data processing systems.

The publishers 104 may include any entities that generate, maintain, provide, present and/or otherwise process content in the environment 100. The publisher "content" can include various types of web-based and/or otherwise presented information, such as articles, discussion threads, reports, analyses, financial statements, music, video, graphics, search results, web page listings, information feeds (e.g., RSS feeds), television broadcasts, radio broadcasts, printed publications, etc.

In some implementations, the publishers 104 may include content providers with an Internet presence, such as online publication and news providers (e.g., online newspapers, online magazines, television websites, etc.), online service providers (e.g., financial service providers, health service providers, etc.), and the like. The publishers 104 can include television broadcasters, radio broadcasters, satellite broadcasters, and other content providers. One or more of the publishers 104 may represent a content network that is associated with the AMS 106.

The publishers 104 may receive requests from the user access devices 108 (or other elements in the environment 100) and provide or present content to the requesting devices. The publishers may provide or present content via various mediums and in various forms, including web based and non-web based mediums and forms. The publishers 104 may generate and/or maintain such content and/or retrieve the content from other network resources.

In addition to content, the publishers 104 may be configured to integrate or combine retrieved content with ads that are related or relevant to the retrieved content for display to users. As discussed further below, these relevant ads may be provided from the AMS 106 and be combined with content for display to users. In some examples, the publishers 104 may retrieve content for display on a particular user access device 108 and then forward the content to the user access device 108 along with code that causes one or more ads from the AMS 106 to be displayed to the user. In other examples, the publishers 104 may retrieve content, retrieve one or more relevant ads (e.g., from the AMS 106 or the advertisers 102), and then integrate the ads and the article to form a content page for display to the user.

As noted above, one or more of the publishers 104 may represent a content network. In such an implementation, the advertisers 102 may be able to present ads to users through this content network.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The AMS 106 manages ads and provides various services to the advertisers 102, the publishers 104, and the user access devices 108. The AMS 106 may store ads in an ad repository 126 and facilitate the distribution or targeting of ads through the environment 100 to the user access devices 108.

The AMS 106 may include one or more data processing systems 116, such as servers or embedded systems, coupled to the network 110. It can also include one or more processes, such as server processes. In some examples, the AMS 106 may include an ad serving system 120 and one or more backend processing systems 118. The ad serving system 120 may include one or more data processing systems 116 and may perform functionality associated with delivering ads to publishers or user access devices. The backend processing systems 118 may include one or more data processing systems 116 may perform functionality associated with identifying relevant ads to deliver, enforcing differential pricing, processing bids and thresholds, performing auctioning processes, processing various rules, performing filtering processes, generating reports, maintaining accounts and usage information, and other backend system processing. The AMS 106 can use the backend processing systems 118 and the ad serving system 120 to distribute ads from the advertisers 102 through the publishers 104 to the user access devices 108.

The AMS 106 may include or access one or more crawling, indexing and/or searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

The AMS 106 may include one or more interface or frontend modules for providing the various features to advertisers, publishers, and user access devices. For example, the AMS 106 may provide one or more publisher front-end interfaces (PFEs) for allowing publishers to interact with the AMS 106. The AMS 106 may also provide one or more advertiser front-end interfaces (AFEs) for allowing advertisers to interact with the AMS 106. In some examples, the front-end interfaces may be configured as web applications that provide users with network access to features available in the AMS 106.

The AFEs and PFEs may include or generate physical or virtual mechanisms by which a user (or system) can input information to the AMS 106 or other system and/or by which a user (or system) can perceive information generated by such systems. In some examples, the AFEs and PFEs may include or generate visual interfaces, such as graphical user interfaces (GUIs). Other types of interfaces can also be used. The interfaces can include one or more physical or virtual elements or widgets that allow a user (or system) to view, select, and/or indicate information.

The AMS 106 provides various advertising management features to the advertisers 102. The AMS 106 advertising features may allow users to set up user accounts, set account preferences, create ads, select keywords for ads, input bidding information, create campaigns or initiatives for multiple products or businesses, view reports associated with accounts, analyze costs and return on investment, target customers in different regions, target ads to particular publishers, track financial information, track ad performance, estimate ad traffic, access keyword tools, add graphics and animations to ads, etc.

The AMS 106 may allow the advertisers 102 to create ads and input keywords for which those ads will appear. In some examples, the AMS 106 may provide ads to user access devices or publishers when keywords associated with those ads are included in a user request or requested content. The AMS 106 may also allow the advertisers 102 to set bids for ads. A bid may represent the maximum and/or preferred amount an advertiser is willing to pay for each ad impression, user click-through of an ad or other interaction with an ad. A click-through can include any action a user takes to select an ad. The advertisers 102 may choose a currency and monthly budget.

The AMS 106 may allow the advertisers 102 to view information about ad impressions, which may be maintained by the AMS 106. The AMS 106 may be configured to determine and maintain the number of ad impressions relative to a particular website or keyword. The AMS 106 may also determine and maintain the number of click-throughs for an ad as well as the ratio of click-throughs to impressions.

The AMS 106 may allow the advertisers 102 to select and/or create conversion types for ads. As noted previously, a conversion may occur, for example, when a user consummates a transaction related to a given ad. A conversion could be defined to occur when a user clicks on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). The AMS 106 may store conversion data and other information in a conversion data repository 136.

The AMS 106 may allow the advertisers 102 to input description information associated with ads. This information can be used to assist the publishers 104 in determining ads to publish. The advertisers 102 may additionally input a cost/value associated with selected conversion types, such as a five dollar credit to the publishers 104 for each product or service purchased. The AMS 106 can also allow advertisers to select placements of publisher sites where ads can be displayed.

The AMS 106 may provide various features to the publishers 104. The AMS 106 may deliver ads (associated with the advertisers 102) to the user access devices 108 when users access content from the publishers 104. The AMS 106 can be configured to deliver ads that are relevant to publisher sites, site content and publisher audiences.

In some examples, the AMS 106 may crawl content provided by the publishers 104 and deliver ads that are relevant to publisher sites, site content and publisher audiences based on the crawled content. The AMS 106 may also target ads based on user information and behavior, such as particular search queries performed on a search engine website, a geographical location of the user, etc. The AMS 106 may store user-related information (e.g., personal profiles of users, geographic locations of users, ad context information) in a general data repository 146. In some examples, the AMS 106 can add search services (e.g., a search box) to a publisher site and deliver ads targeted to search results generated by requests from visitors of the publisher site. A combination of these and other approaches can be used to deliver relevant ads.

The AMS 106 may allow the publishers 104 to search and select specific products and services as well as associated ads to be displayed with content provided by the publishers 104. For example, the publishers 104 may search through ads in the ad repository 126 and select certain ads for display with their content.

The AMS 106 may be configured to target ads created by the advertisers 102 to the user access devices 108 directly or through the publishers 104. The AMS 106 may target ads to a particular publisher 104 or a requesting user access device 108 when a user requests search results or loads content from the publisher 104.

In some configurations, the AMS 106 may target ads using a searching portion and a content portion. The searching portion may include one or more elements for providing various searching features to the user devices 108 and targeting ads to users based on search terms. The content portion may include one or more elements for targeting ads to users based on content rather than specific terms. The content portion may target ads based on content provided by the publishers 104.

The AMS 106 can target ads using static targeting and/or dynamic targeting. Static targeting may involve targeting ads based on some static publisher-specific placement criteria, such as by site or channel. In static or placement targeting, the advertisers 102 can specify where ads will be served. Dynamic targeting may involve using one or more matching processes that match ads to context, geographic location, language, and other criteria. Various ranking and searching processes can also be used.

The AMS 106 may be configured to identify relevant ads for targeting using various information, such as ad size, ad keywords, content keywords, geographic information, web page identifiers and/or content indices. As an example, the AMS 106 can receive a URL of a requested content page (e.g., from the user access device 108 or the publisher 104). The AMS 106 may match the URL to indexed content keywords associated with the URL to determine a user interest. The AMS 106 may then match the user interest with ads in the repository 126 relevant to the interest. The AMS 106 may, for example, use ad keywords from the advertisers 102 and/or other ad information to identify the ads. The AMS 106 could compare ad keywords from the advertisers 102 or other information to content keywords and/or content in the content page to identify relevant ads. In some examples, the ad selections and preferences specified by the publishers 104 can be used by the AMS 106 when it selects relevant ads.

In some implementations, the AMS 106 may manage and process financial transactions among and between elements in the environment 100. For example, the AMS 106 may credit accounts associated with the publishers 104 and debit accounts of the advertisers 102. These and other transactions may be based on conversion data, impressions information and/or click-through rates received and maintained by the AMS 106.

The user access devices 108 may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114, and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed advertisers 102, publishers 104 and/or user access devices 108, which may be discrete, integrated modules or distributed systems. Similarly, the environment 100 is not limited to a single AMS 106 and may include any number of integrated or distributed AMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine.

Figure 2:
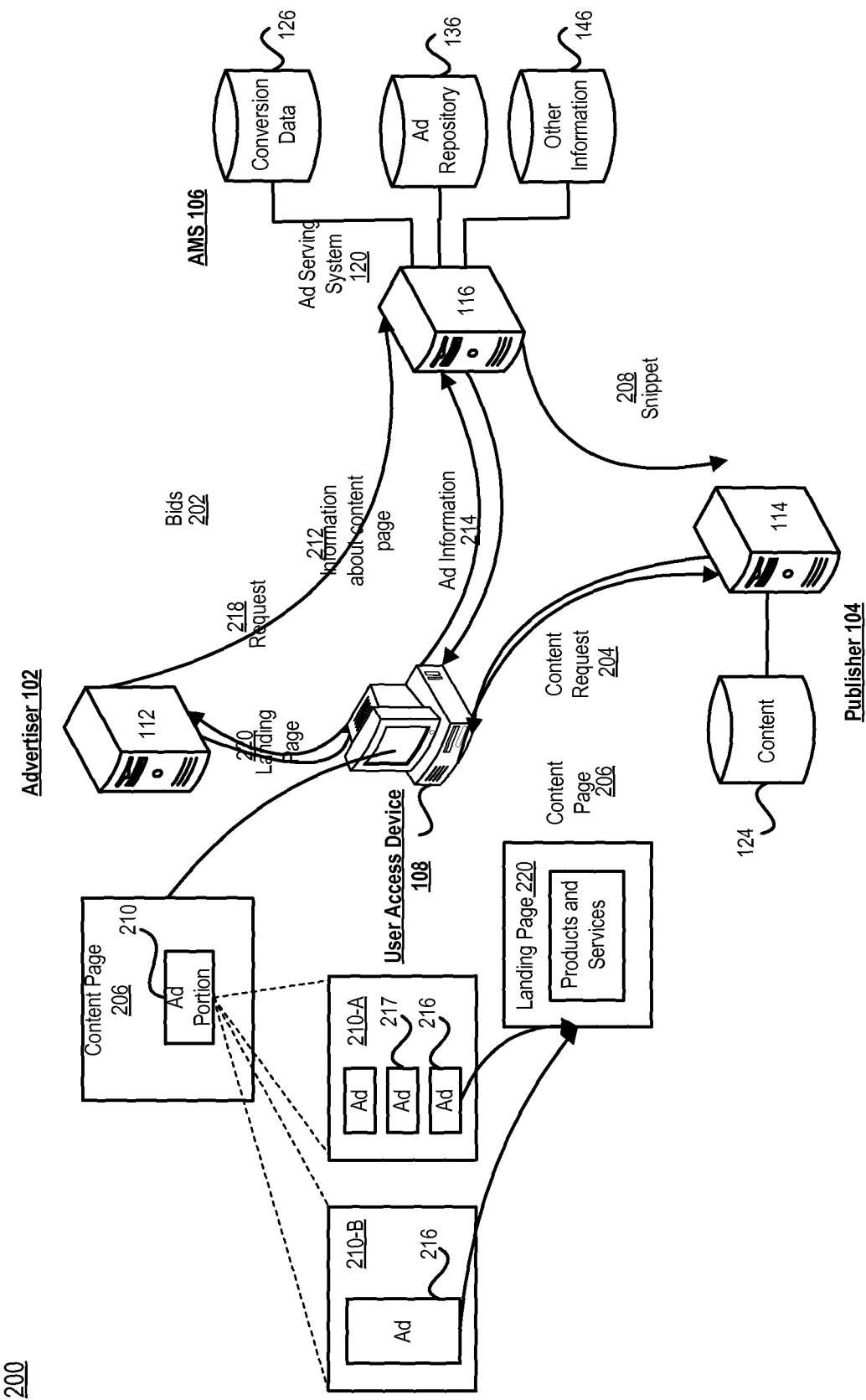
FIG. 2 is a data flow diagram showing an example data flow consistent with an example advertising environment.

FIG. 2 illustrates an example data flow 200 within the environment 100. In particular, the data flow 200 is showing ad component interactions when ads are served and differential thresholds are applied. The data flow 200 is an example only and not intended to be restrictive. Other data flows may therefore occur in the environment 100 and, even with the data flow 200, the illustrated events and their particular order in time may vary.

In the data flow 200, the AMS 106 receives bids 202 from one or more advertisers 102. The bids 202 generally represent a maximum amount an advertiser is willing to pay for each ad impression (or thousand impressions), user click-through of an ad, or other interaction with an ad. The bids 202 can include CPC and/or CPM bids. In some examples, the bids 202 can be received in the system 106 prior to auctioning of ads.

During the data flow 200, the publisher 104 may receive a content request 204 from a particular user access device 108. The content request 204 may, for example, include a request for a web document on a given topic (e.g., abdominal workouts). In response to the request 204, the publisher 104 may retrieve relevant content (e.g., an abdominal workout article) from the content repository 124 or some other source.

The publisher 104 may respond to the content request 204 by sending a content page 206 or other presentation to the requesting user device 108. The content page 206 may include the requested content (e.g., the abdominal workout article) as well as a code "snippet" 208 associated with an ad. A code "snippet" refers, for example, to a method used by one device (e.g., a server) to ask another device (e.g., a browser running on a client device) to perform actions after or while downloading information. In some examples, a code "snippet" may be implemented in JavaScript® code or may be part of HTML (Hypertext Markup Language) or other web page markup language or content.

The AMS 106 may provide the code snippet 208 to the publisher 104 and/or the user access device 108. The code snippet can originate and/or be provided from other sources. As the requesting user device 108 loads the content page 206, the code snippet 208 causes the user device 108 to contact the AMS 106 and receive additional code (e.g., Java Script® or the like), which causes the content page 206 to load with an ad portion 210.

The ad portion 210 may be similar to, or include, an ad block. The ad portion 210 can include any element that allows information to be embedded within the content page 206. In some examples, the ad portion 210 may be implemented as an HTML element, such an I-Frame (inline frame) or other type of frame. The ad portion 210 may be hosted by the AMS 106 or the publisher 104 and may allow content (e.g., ads) from the AMS 106 or the publisher 104 to be embedded inside the content page 206. Parameters associated with the ad portion 210 (e.g., its size and shape) can be specified in the content page 206 (e.g., in HTML), so that the user access device 108 can present the content page 206 while the ad portion 210 is being loaded. Other implementations of ad portion 210 may also be used.

The ad portion 210 may send the AMS 106 information about the content page 212. This information 212 may include information describing the manner (e.g., how, when, and/or where) in which ads can be rendered by the user access devices 108. The information 212 may also include ad attributes and parameters, such as size, shape, color, font, presentation style (e.g., audio, video, graphical, textual, etc.), etc. The information 212 may also specify a quantity of ads desired. In some implementations, the information 212 may include information for automatically expanding or shrinking an ad to fit a particular ad block.

The formatting and content information 212 can include information associated with the content displayed in content page 206. Such information may include a URL associated with the requested content page 206. The information 212 can include the requested content itself, a category corresponding to the requested content or the content request, part or all of the content request 204, content age, content type (e.g., text, graphics, video, audio, mixed media, etc.), geo-location information, and the like.

In response to the information 212, the AMS 106 may provide the user access device 108 with ad information 214. The ad information 214 may include one or more ads 216 for placement in the ad portion 210 of the content page 206. In some implementations, the ad information 214 may also include a signed or encoded specification of an ad. The ad portion 210 may populate with ads included in the ad information 214, such as the ad 216.

The ad information 214 may include ads that are relevant to user interest. The AMS 106 may retrieve and provide relevant ads based on the information 212 received from the user access device 108. The AMS 106 may retrieve the ad information 214 from the ad repository 126 using the backend processing systems 118, for example. The AMS 106 may retrieve relevant ads using information from a crawling module, various keywords, various statistical associations between ads and content, and/or preference information associated with the publishers.

The AMS 106 may decide whether to serve the relevant ads based on various auctioning and pricing processes. When making ad serving decisions, the AMS 106 may evaluate the bids 202 and/or measurement metrics (which may be calculated based on the bids 202) associated with ads. The AMS 106 may compare the bids and/or metrics associated with relevant ads to a minimum activation threshold (e.g., a minimum CPM threshold) in order to determine whether the ads should be served to publisher content (e.g., the content page 206). In some examples, threshold decisions may be based on rules maintained by the backend processing systems 118.

In some examples, the AMS 106 may apply differential pricing to ads during the auctioning and serving of the ads. To apply differential pricing, the AMS 106 can dynamically select (e.g., from a database) and apply different pricing thresholds based on a size or other aspects (e.g., rendering aspects) of ads. For example, if the ad 216 shares the ad portion with other ads (e.g., ad 217), as illustrated in ad portion 210-A, then the ad 216 may be tested against a first minimum activation threshold (e.g., $0.10). If the ad 216 occupies the entire ad portion 210, as illustrated in ad portion 210-B, then the ad 216 may be tested against a minimum activation threshold (e.g., $0.25) that is higher than the threshold used if the ad 216 were to occupy a part of the ad portion 210.

In some implementations, as noted above, differential pricing can be applied for ads that are expanded. For example, the AMS 106 may select a first threshold (e.g., $0.10) if a text ad is displayed in the ad portion with other ads. If that text ad is expanded to occupy the entire ad portion, then the AMS 106 may select and apply a different threshold (e.g., $0.20). Various intermediate thresholds can also be used. If the ad is expanded to occupy half of the ad portion, a different threshold (e.g., $0.15) could be applied. As noted above, the thresholds can include minimum CPM thresholds.

When selecting and serving ads with publisher content, the AMS 106 may dynamically expand or otherwise alter an ad based on various criteria. For example, if a particular eligible text ad has a higher eCPM than all other eligible ads (image ads or text ads), then the AMS 106 can decide to expand that text ad to take over the entire ad portion 210, rather than displaying the text ad with the other eligible ads in the ad portion 210. As another example, a text ad can be expanded if it is the only relevant ad identified for display.

In some examples, the AMS 106 may use the ad information 214 to identify that the ad 216 is meant to occupy a large amount of the ad block. Similarly, the AMS 106 may use ad information 214 to identify that the ad 216 is meant for display in only a portion of the ad block.

In some implementations, when a user clicks on the displayed ad 216, an embedded code snippet may direct the user access device 108 to contact the AMS 106. During this event, the user access device 108 may receive an information parcel, such as a signed browser cookie, from the AMS 106. This information parcel can include information, such as an identifier of the selected ad 216, an identifier of the publisher 104, and the date/time the ad 216 was selected by the user. The information parcel may facilitate processing of conversion activities or other user transactions.

The user access device 108 may then be redirected to the advertiser 102 associated with the selected ad 216. The user access device 108 may send a request 218 to the associated advertiser 102 and then load a landing page 220 from the advertiser 102. The user may then perform a conversion action at the landing page 220, such as purchasing a product or service, registering, joining a mailing list, etc. A code snippet, which may be provided by the AMS 106, may be included within a conversion confirmation page script, such as a script within a web page presented after the purchase. The user access device 108 may execute this code snippet, which may then contact the AMS 106 and report conversion data to the AMS 106. The conversion data may include conversion types and numbers as well as information from cookies. The conversion data may be maintained in a conversion data repository.

FIG. 2 is an example only and not intended to be restrictive. Other data flows may therefore occur in the environment 100 and, even with the data flow 200, the illustrated events and their particular order in time may vary. Further, the illustrated events may overlap and/or may exist in fewer steps. Moreover, certain events may not be present and additional and/or different events may be included.

Figure 3:
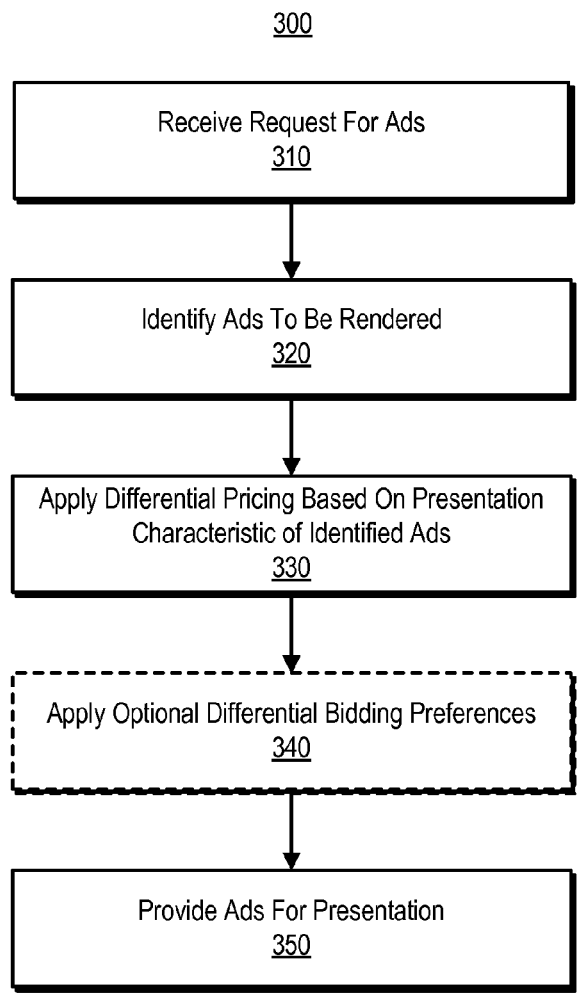
FIG. 3 is a flow diagram of an example process for serving advertisements.

FIG. 3 is a flow diagram of an example process 300 for serving ads. In general, the process 300 can be used to provide content to a requesting entity, such as a user, an advertiser, an ad system, a publisher, or others. For example, the process 300 can be used to receive content such as advertising content, data files, music files, images, links, and other web content. In some implementations, the process 300 may be performed by one or more elements in the AMS 106. The process 300 can be performed by other systems in conjunction with or instead of the AMS 106.

Stage 310 receives a request for ads. For example, a user can submit an ad request to advertisers 102 and in return can receive advertising content, publisher content, or other web content. The ad request may include keywords, ad type or size, targeting criteria, bidding information, or other information. In some implementations, the ad request can trigger the ad serving system 120 in the AMS 106 to provide ads to a system or user that are specifically targeted to information in the ad request. For example, the ad request may cause the AMS 106 to target one or more ads to a particular publisher or user access device based on search terms or keywords provided in the ad request.

In some implementations, receiving a request for ads involves a publisher 104 receiving a content request (e.g., a search request, a request to access a webpage, etc.) from a user access device 108 and the publisher 104 providing information associated with the content request (e.g., pricing, search terms, a requested URL, the content request itself, user location, formatting information, ad parameters, etc.) to the ad serving system 120 in the AMS 106. In some implementations, the ad request may include information similar to the content page information 212 discussed above in connection with FIG. 2.

Stage 320 identifies ads or content to be rendered based on information received in the ad request. In some examples, identifying the content to be rendered includes identifying ads to be rendered in a publisher's site. This may involve searching the ad repository 136 for ads. The searching may involve searching for ads that are relevant to publisher content requested by a user. Relevant ads can be determined based on specific advertiser settings and instructions, and/or they can be determined using one or more matching processes. Specifically, the matching processes can match ads to context, ad block dimensions, price category, geographic location, language, and/or other criteria. In some implementations, the backend systems 118 in the AMS 106 can identify relevant ads.

In some implementations, the identified ads can include text ads that are placement targeted, using CPC or CPM pricing. Placement targeting can allow an advertiser to choose individual spots in the content network 110 where the advertiser wishes to have an ad appear. In some examples, a placement may include an entire website or a subset of a site, such as only the "Editorial" page of a news site. Thus, a particular audience may be handpicked based on CPC or CPM pricing.

In some implementations, the identified ads may be text ads that are keyword targeted with CPC or CPM pricing. In such a case, the AMS 106 may determine where to place a particular ad on the fly (e.g., right before placement) according to the keyword in the ad. In some examples, a unique CPC amount or destination URL can be specified for each keyword in a keyword-targeted ad group. Similarly, a unique CPM amount or destination URL can be specified for each site in a placement-targeted campaign. In some implementations, the identified ads may be non-text ads or ads with text and non-text elements, such as links, images, sound, animations, and the like.

Stage 330 applies differential pricing based on presentation (e.g., rendering) characteristics of identified ads. This can involve, for example, the ad serving system 120 enforcing different minimum thresholds based on a rendering aspect of an ad, such as size. A minimum threshold generally represents the minimum price for activating particular content. In some examples, the minimum threshold can be selected based on the amount of available display area that is occupied by an identified ad to be rendered in a publisher site (e.g., the ad identified above (320)).

In some examples, if a text ad is expanded to cover an entire ad block, the environment 100 can select and apply a higher minimum threshold, such as the threshold used for an image ad or other ad which occupies the entire ad slot. This can provide advantages, such as maintaining publisher revenues irrespective of the type of ad served. In addition, the adherence to the higher minimum threshold for an expanded ad can inhibit repeated exposure ads (e.g., spam) to users due to the availability of low cost impressions. In some implementations, the differential bidding thresholds can be set to benefit an advertiser, a publisher, or both.

Stage 340 is optional and applies differential bidding preferences. In some examples, applying differential bidding preferences can involve allowing advertisers to provide different bids for the same content (e.g., an ad). Differential bidding can allow an advertiser to set different bids for an ad based on whether the ad is rendered with other ads or expanded to occupy an entire ad block. For example, an advertiser can bid $2.00 if the ad occupies a portion of the ad block and can bid $5.00 if the bid occupies the entire ad block. Differential bidding can involve accessing the different bids and determining whether any of the bids exceed a selected activation threshold or cause a measurement metric to exceed the selected threshold. If one or more bids exceed (or cause a metric to exceed) the selected activation threshold, then the AMS 106 can select an appropriate bid (e.g., the highest bid or the lowest bid that causes the ad to satisfy the threshold) and provide the identified ad content for rendering in the publisher site. Further details of differential bidding are discussed below in connection with FIGS. 5, 6A, and 6B. In some implementations, stages 330 and 340 can be performed as part of the same stage.

Upon completion of applying differential pricing and optionally applying differential bidding preferences, the process 300 can provide ads for rendering in stage 350. For example, the identified ads can be rendered within a particular publisher's site content if it is determined that the bid exceeds the selected threshold value.

Figure 4:
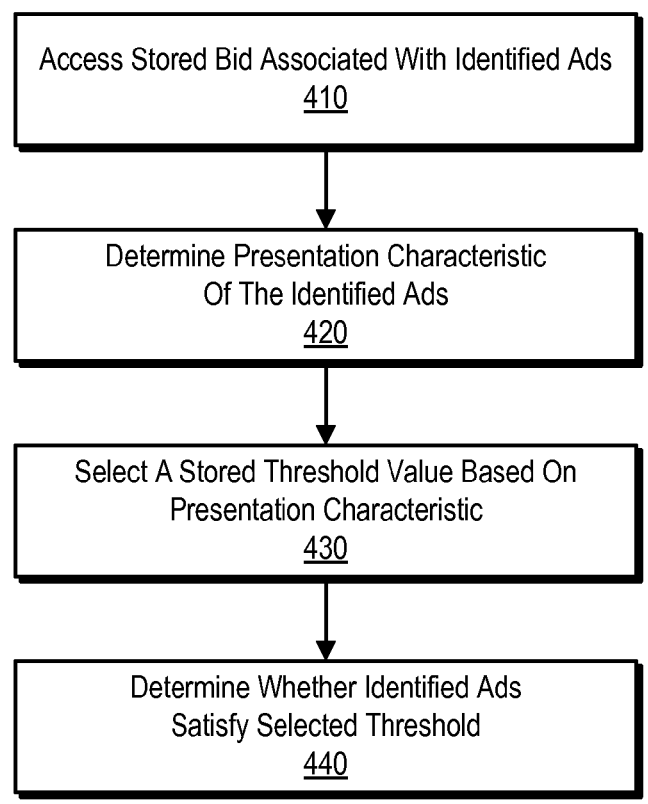
FIG. 4 is a flow diagram of an example process for applying differential pricing.

FIG. 4 is a flow diagram of an example process 400 for applying differential pricing. In some implementations, the process 400 may be performed by one or more elements in the AMS 106. The process 400 can be performed by other systems in conjunction with or instead of the AMS 106.

Stage 410 accesses stored bids associated with identified ads. The identified ads may, for example, include ads that have been identified as contextually relevant to particular content displayed on a publisher web page. A stored bid for an ad can represent the value (e.g., a maximum price) that an advertiser is willing to pay for each click of, or for each one-thousand impressions, of the ad. For example, a stored bid for a CPC, placement targeted text ad could be $0.40.

Stage 420 determines presentation (e.g., rendering) characteristics of the identified ads. A rendering characteristic can include a characteristic of how an ad is to be rendered in a publisher site. Determining a rendering characteristic can include determining the amount of ad block occupied by a particular ad. In some examples, the AMS 106 can determine the rendering characteristic during auctioning and serving of content. The AMS 106 can use various information from databases and other sources to determine the rendering characteristics. In some examples, the AMS 106 can determine rendering characteristics based on whether an ad has been expanded (e.g., expanded by a component of the AMS 106).

Stage 430 selects a stored threshold value based on the determined presentation characteristic. This can involve, for example, the AMS 106 enforcing different minimum thresholds based on the rendering aspect of an ad. For example, a first threshold can be applied if a selected ad uses one-quarter of the available ad block. Similarly, a second threshold can be applied when the ad uses the entire available ad block. In some implementations, intermediary thresholds can also exist. Continuing with the example above, a third bidding threshold can be applied for cases where an ad expands to exactly half the size of the ad space. Here, a threshold exists between the one quarter space and the full space thresholds. In general, any number of thresholds can be applied for each rendering characteristic. Moreover, the rendering characteristics can each correlate to a distinct and separate set of thresholds.

In some implementations, the AMS 106 can determine if an identified ad will be expanded, for example, to fill an ad block. If the ad is indeed expanded, the AMS 106 may choose a higher threshold (e.g., a higher CPM threshold). An ad can be expanded, for example, because it is the only relevant ad or because it has a higher eCPM than the other ads.

As an example, the AMS 106 can select from among two thresholds for the "ad size" rendering characteristic discussed above. A first or default threshold "A" can be set at $0.25 while a second higher threshold "B" can be set at, for example, $1.00. In this example, if the ad is displayed with another ad or ads in a portion of the available ad space, the AMS 106 may select the default threshold "A." If the ad is expanded to occupy the entire ad block, the AMS 106 may select the higher threshold "B."

Stage 440 determines whether a received bid causes the ad to satisfy the selected threshold. In the example above, the threshold "B" (i.e., the $1.00 threshold) can be selected for an expandable ad that occupies the entire ad block. The ad serving system 120 can compare a stored bid, such as a bid for $0.50, with the selected threshold to determine whether the ad satisfies the selected threshold. In this example, since B is the selected threshold, the bid for $0.50 does not meet or exceed the $1.00 minimum. Therefore, the AMS 106 can decline to serve the ad. In some example, a metric can be compared to the selected threshold, in addition to or as an alternative to the bid.

Figure 5:
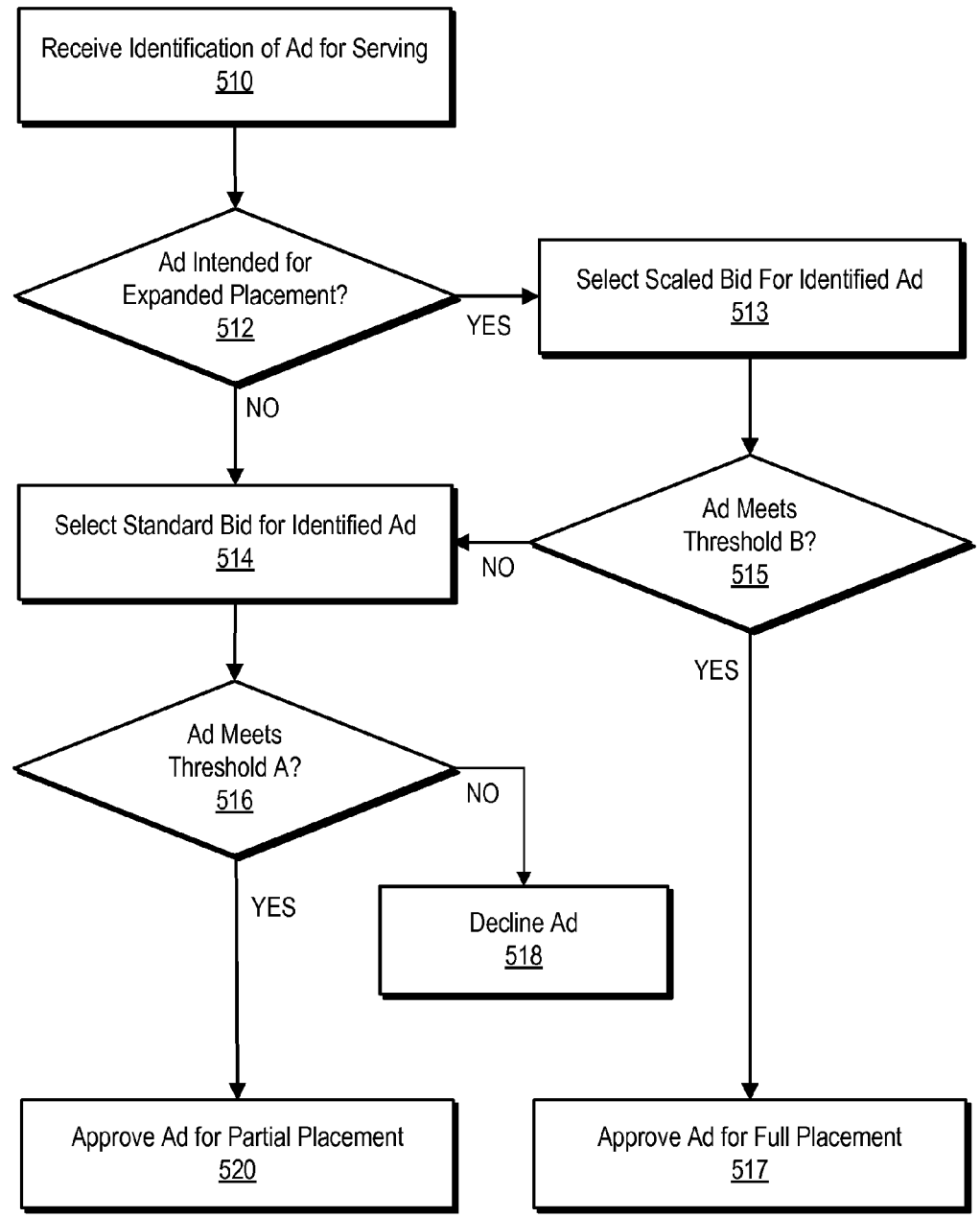
FIG. 5 is flow diagram of an example process for applying differential bidding in conjunction with differential pricing.

FIG. 5 is a flow diagram of an example process 500 for applying differential bidding in conjunction with differential pricing. The process 500 may be performed by one or more elements in the AMS 106. The process 500 can be performed by other systems in conjunction with or instead of the AMS 106.

Differential bidding can, for example, be provided as an option to advertisers. Differential bidding can allow the advertisers 102 to choose a rendering aspect of an ad and provide different bidding levels. In some implementations, advertisers can effect differential bidding by selecting base bids and bid multipliers. For example, an advertiser can select a base bid of $1 for an ad. The advertiser can also select a multiplier or scaling factor (e.g., 1.5) to be used if an ad will occupy an entire ad block when displayed, rather than a portion. In some implementations, the advertiser can apply incremental multipliers.

Differential bidding can be provided based on other aspects, such as placement in a particular newspaper, magazine, radio station or other online webpage. For example, an advertiser may bid higher for placement in the New York Times online newspaper.

As an example of differential bidding, the advertiser 102 may offer a $2 bid in the event the ad is shown with other ads. The advertiser 102 may offer a $5 bid in the event the ad is provided expanded in an ad block. An activation threshold can be selected for the ad based on a rendering characteristic of the ad, such as its size. In some examples, both bids will be considered when determining if the ad satisfies the selected threshold. If both bids fail to cause the ad to satisfy the selected activation threshold, the ad may be declined. If however at least one of the bids results in satisfying the threshold, the ad may be served. In some implementations, if both bids meet the threshold, the lowest bid that exceeds the threshold can be selected.

Stage 510 of process 500 receives identification of an ad for serving. For example, the ad serving system 120 may identify an ad for serving to publisher content (e.g., a web page) accessed by a user access device 108. The system 120 can identify an ad based on user request, keywords, rendering aspect in the ad, etc.

Stage 512 determines whether the ad is intended for expanded (e.g., full) placement in an ad block. For example, stage 512 may determine whether the ad has been expanded to occupy the entire available ad space in a publisher web page. As noted above, an ad can be expanded to occupy an entire ad space, for example, because it is the only relevant ad or because it has a higher eCPM than other eligible ads, for example.

Process 500 may access bids for the ad and select a bid based on whether the ad is intended for full or partial placement. Full placement may represent the situation in which the ad occupies the entire block. Partial placement may represent the situation where the ad occupies a portion of the ad block, either displayed alone in the ad block or with other ads that occupy other portions. The advertisers 102 can provide multiple bids for one ad based on whether the ad is displayed alone (e.g., expanded) or with other ads. An advertiser can provide any number of bids. For example, three bids may be applied to one ad if the ad can be rendered in three forms (e.g., expanded, linked with other ads, or bannered in a list of ads). In some implementations, the bid may be higher for an expanded ad than for a bannered ad that resides among other ads.

If stage 512 determines the ad is not intended for expanded placement, stage 514 selects a standard bid for the identified ad. The standard bid for the identified ad pertains to the price an advertiser might pay, for example, for placement of an average sized ad without size adjustments. If stage 512 determines that the ad is not intended for expanded placement, then stage 514 selects a standard bid for the identified ad. If stage 512 determines the ad is intended for expanded placement, stage 513 selects a scaled bid for the identified ad. The scaled bid for the identified ad pertains to the price an advertiser might pay for placement of an expanded ad.

Stage 515 determines whether the scaled bid causes the ad to satisfy the threshold B (e.g., $2). Threshold B can represent an activation threshold for an expanded ad occupying an entire ad block. In some examples, the ad serving system 120 can determine if the scaled bid meets the threshold B or causes a metric to meet the threshold. If stage 515 determines that the scaled bid causes the ad to satisfy the threshold B, stage 517 approves the ad for full placement.

If stage 515 determines the scaled bid does not cause the ad to satisfy the threshold B, the process 500 may return to stage 514 to select the standard bid for the identified ad. Stage 516 then determines whether the standard bid is sufficient to cause the ad to satisfy the threshold A (e.g., $0.25), which can be the threshold used for partial placement of the ad. If the ad satisfies the threshold A, stage 520 approves the ad for partial placement. For example, the ad serving system 120 can approve the ad for placement with other content or ads. If stage 516 determines the standard bid is not sufficient to cause the ad to satisfy threshold A, stage 518 declines the ad.

Figure 6:
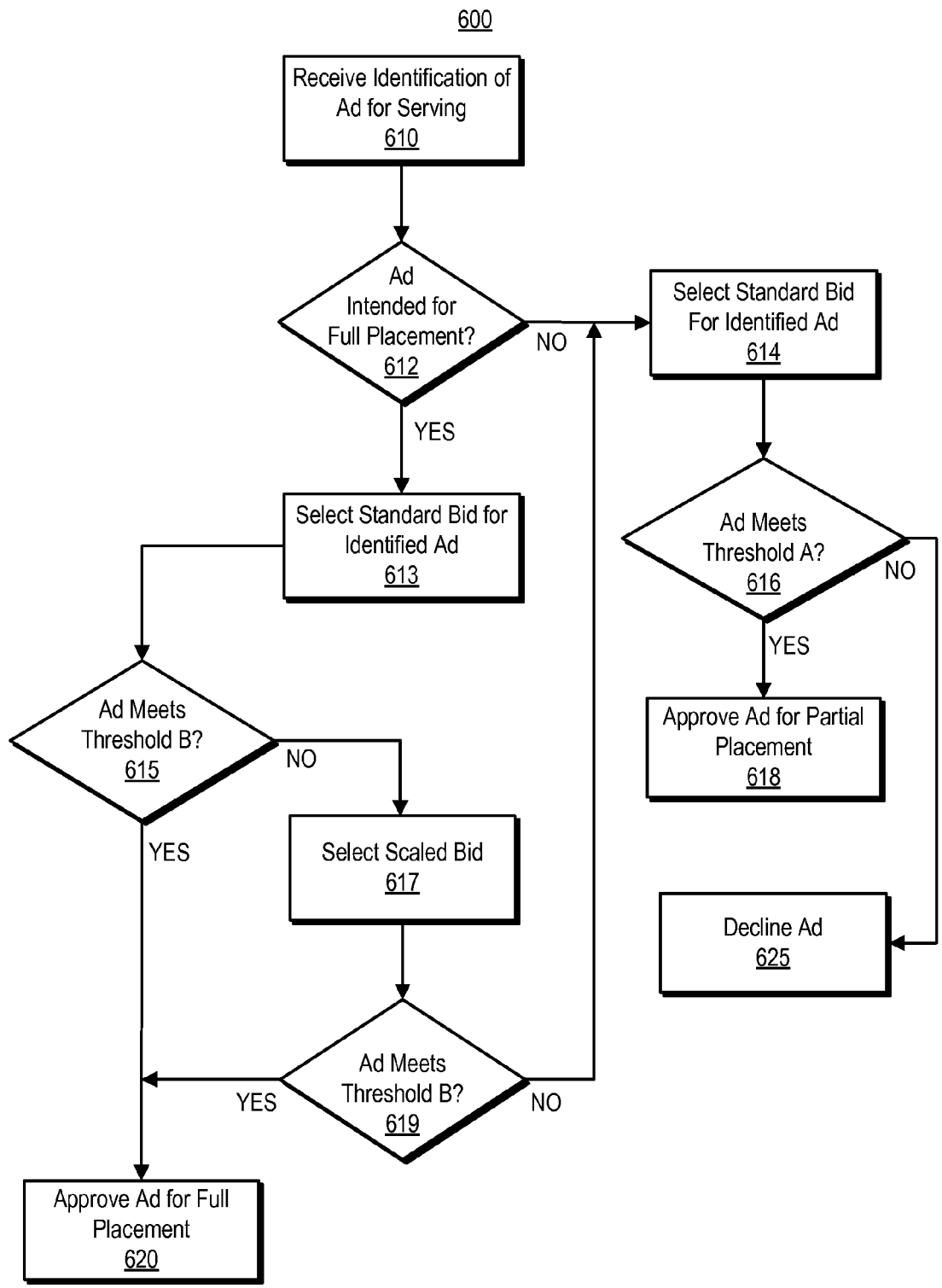
FIG. 6 is a flow diagram of another example process for applying differential bidding in conjunction with differential pricing.

FIG. 6 is a flow diagram of another example process 600 for applying differential bidding in conjunction with differential pricing. In some implementations, the process 600 may be performed by one or more elements in the AMS 106. The process 600 can be performed by other systems in conjunction with or instead of the AMS 106.

The process 600 includes determining whether an ad is intended for partial placement within an ad space or intended to occupy the entire slot. If the ad is intended to occupy the entire slot, the process determines whether the standard bid or the scaled bid is sufficient to cause the ad to satisfy an increased threshold B (e.g., $2). If the standard bid does not cause the ad to satisfy threshold B, the scaled bid (e.g., higher priced) is selected and tested. In the event that neither the scaled bid nor the standard bid is sufficient to meet threshold B, the standard bid is selected and the ad is tested against a lower threshold A (e.g., $0.25). Likewise, if the ad is intended for partial placement, the standard bid is selected and the ad is tested against the threshold A. If the ad does not meet threshold A using the standard bid, the ad is declined.

Stage 610 of process 600 receives identification of an ad for serving. For example, the ad serving system 120 may identify an ad for serving to a particular publisher site accessed by a user access device 108.

Stage 612 determines whether an ad is intended for full placement. For example, stage 612 determines whether a text ad has been expanded to occupy the entire available ad space in a publisher web page. In some examples, the ad serving system 106 may access placement information in ad repository 136, information repository 146, or other source. If stage 612 determines the ad is intended for full placement, stage 613 selects a standard bid for the identified ad. If the ad is not intended for full placement, stage 614 selects the standard bid for the identified ad.

Stage 615 determines whether the standard bid caused the ad to satisfy threshold B (e.g., $2). If stage 615 determines that the ad does meet the threshold B, stage 620 approves the ad for full placement. If the ad does not meet the threshold B, stage 617 selects the scaled bid.

Stage 619 determines if the scaled bid causes the ad to satisfy the threshold B. If the ad meets the threshold B with the scaled bid, stage 620 approves the ad for full placement. If the ad does not meet the threshold B with the scaled bid, the process returns to stage 614, which selects the standard bid for the identified ad.

Stage 616 determines whether the standard bid caused the ad to satisfy the threshold A (e.g., $0.25). The threshold A may represent the standard or default threshold, whereas the threshold B may represent an increased threshold. If the ad meets the threshold A with the standard bid, stage 618 approves the ad for partial placement. If the ad does not meet threshold A with the standard bid, stage 625 declines the ad.

The illustrated configurations and sequences of events in FIGS. 3-6 are examples and not intended to be limiting. Other processes and configurations may therefore be used and, even with the process depicted in FIGS. 3-6, the illustrated events and their particular order in time may vary. Further, the illustrated events may overlap and/or may exist in fewer steps. Moreover, certain events may not be present and additional events may be included in the illustrated process.

Figure 7:
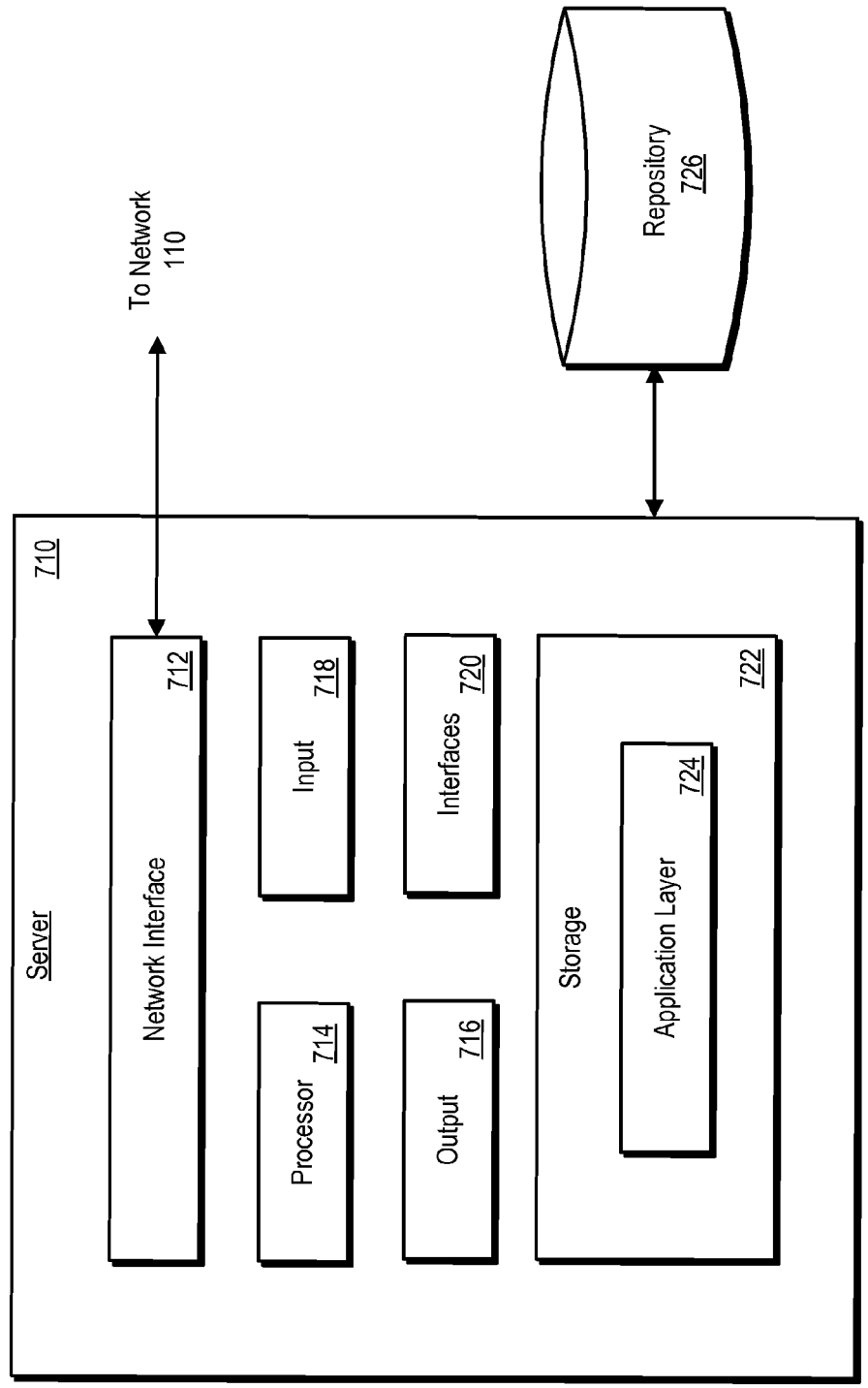
FIG. 7 is a block diagram of an example data processing system configuration.

FIG. 7 is a block diagram of an example configuration 700 of a server computer system 710. In some implementations, the data processing systems 112, 114, and 116 depicted in FIG. 1 could be configured in a manner consistent with configuration 700. The configuration 700 is an example only, and the systems 112, 114, and 116 could be configured in other ways. Further, each of the servers could have its own individual structure and configuration. Moreover, as noted above, the functions provided by the systems 112, 114, and 116 could be performed by a single server computer or could be performed by a single server process running on a single computer.

In the configuration 700, the server 710 may include various components, such as a network interface 712, a processor 714, an output 716, an input 718, interfaces 720, and a storage 722. One or more system buses (not illustrated) may interconnect these components. The number, identity, and arrangement of elements in the configuration 700 are not limited to what is shown, and additional and/or different elements may be contained in or coupled to the elements shown. Further, configuration 700 may include fewer components than what is illustrated.

The network interface 712 may facilitate connectivity with a network, such as the network 110. Network interface 712 may be any appropriate wireline (e.g., IEEE 1394, USB, etc.) or wireless (e.g., IEEE 802.11™, Bluetooth®, IrDA®, etc.) mechanism for facilitating unidirectional or bidirectional transmission of data between the server 710 and a network. The network interface 712 may include one or more network cards and/or data and communication ports.

The processor 714 routes information among components and executes instructions from storage 722. Although FIG. 7 illustrates a single processor, the system 710 may include any number of general- and/or special-purpose processors. The processor 714 may be implemented, for example, using one or more commercially available INTEL® processors.

The output 716 may present text, images, video, audio, or any other type of information. Examples of the output 716 include video display devices, audio display devices, printers, and the like. The output 716 may display user interface information for various software applications running on the server 710, as well as the operating system programs necessary to operate the system. The output 716 may present information by way of a cathode ray tube, liquid crystal, liquid crystal on silicon, light-emitting diode, gas plasma, laser, or other type of display mechanism. The output 716 could also be configured to receive, generate and/or present holographic or other visual representations. The output 716 may be configured to audibly present information, and it may include suitable components for receiving and presenting audio signals. Although FIG. 7 illustrates a single output 716, the server 710 may include any number of similar or different output devices.

The input 718 may include components such as a keyboard, a mouse, a pointing device, a joystick, and/or a touch screen. The input 718 may also include audio- or video-capture devices (e.g., video cameras, microphones, etc.) and/or various sensors for sensing emissions (e.g., thermal, motion, sound, etc.). It may also include one or more information reading devices (e.g., scanners, disk drives, etc.) and/or input ports. Although FIG. 7 depicts the input 718 as a single discrete element, the server 710 may include any number of similar or different input devices. For example, the server 710 could include a keyboard and a mouse as well as a video-capture device, a scanner and several disk drives.

A user of the server 710 may input commands to control and operate functionality of the server 710 by way of the output 716 and the input 718. These commands may, for example, be input by way of user manipulation of physical controls, such as a keyboard or mouse. The user may input commands to select and manipulate graphics and text objects presented on the output 716 in order to operate and control the system 710.

The interfaces 720 may include various interfaces for facilitating bidirectional or unidirectional communication between the server 710 and one or more peripheral or other devices. The peripheral devices may include, for example, output devices (e.g., a monitor, a printer, a speaker, etc.), input devices (e.g., a keyboard, a mouse, a scanner, etc.), or any other device operable to connect to the server 710. The interfaces 720 may include a combination of hardware, software, and/or firmware components. The interfaces 720 may include various connection ports, such as USB, RS-232, RS-485, Fibre Channel, Ethernet, IEEE 1394, RG-6, and/or TOSLINK®.

The storage 722 may provide mass storage and/or cache memory for the server 710. The storage 722 may be implemented using a variety of suitable memory elements. The memory elements may include, for example, solid state elements, optical elements, polymer elements, magnetic elements, and/or organic elements (e.g., crystals). The memory elements may be volatile or non-volatile and may be randomly or sequentially accessed. The storage 722 may include random access memory (RAM), flash RAM, read-only memory (ROM), erasable programmable read-only memory (EPROM), and electrically erasable programmable read-only memory (EEPROM). The storage 722 may include one or more fixed disk drives (e.g., a hard drive, RAID storage, etc.) and one or more removable disk drives (e.g., a CD-ROM drive, DVD drive, etc.). Although a single storage module is shown, the server 710 may include any number of individually configured storage modules.

The storage 722 may store program code for various applications, an operating system (e.g., Windows® XP, Linux® OS), an application-programming interface, application routines, middleware components, and/or other executable instructions. The storage 722 may include program code and information for communications (e.g., TCP/IP communications), middleware components, kernel and device drivers, invariant low-level systems code, data for basic input and output, and various configuration information.

The storage 722 may maintain an application layer 724, which may include various software programs and modules. Such programs and modules could be transferred to a hard drive (not shown) in the storage 722 by way of network transmissions (e.g., an Internet download) and/or removable disks (also not shown), such as a CD-ROM or DVD.

In the configuration 700, the server 710 may be coupled to one or more repositories 726. In some examples, the repositories 124, 126, 136 and 146 may be implemented in a manner consistent with the repositories 726. The repository 726 may include any structured collection or aggregation of information that is stored and accessible. In some implementations, the repositories 726 may include one or more structured data archives distributed among one or more network-based data processing systems. The repositories 726 may include one or more schemas for organizing stored information. In some examples, the repositories 726 may include one or more relational databases and systems, distributed databases, object-oriented databases, and/or any other types of databases. Examples of databases include Oracle® databases, IBM DB2® systems, MySQL® databases, XML databases, and the like. Although illustrated as coupled to the system 710, the repositories 726 could be distributed and/or included in various systems and/or networks.

Figure 8:
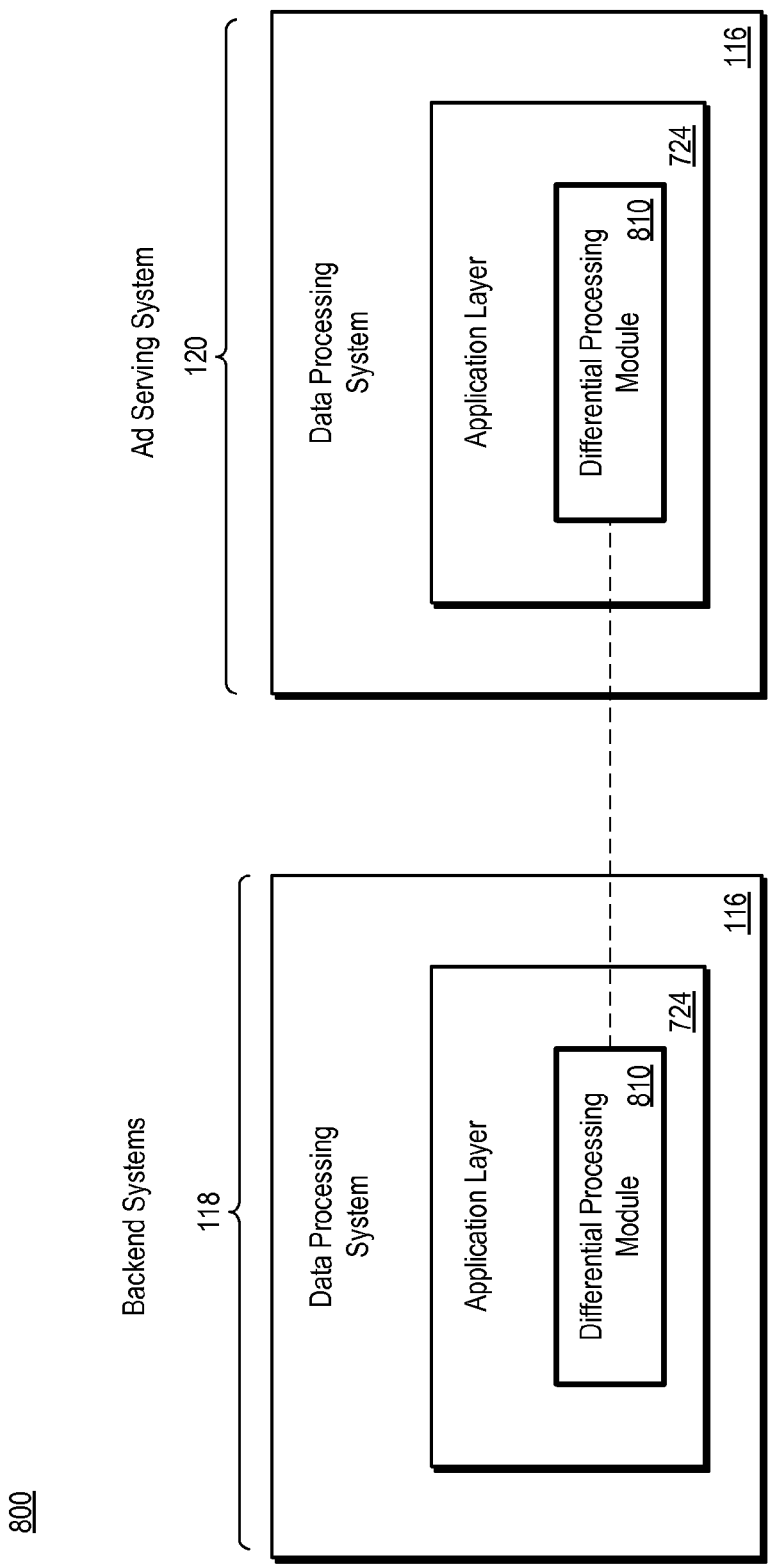
FIG. 8 is a block diagram of an example advertising management system.

FIG. 8 is a block diagram of an example advertising management system 800. The system 800 may represent the configuration of one or more application layers 724 of one or more data processing systems 116 maintained by the AMS 106. As illustrated in FIG. 8, the system 800 may include a differential processing module 810. In FIG. 8, the differential processing module 810 is located in both the backend system 118 and the ad serving system 120. This is merely an example implementation, and the functionality of the differential processing module 810 can be distributed or exist in more or less modules than what is illustrated in FIG. 8. In some implementations, the module 810 can be included within the system 120 or in one or more backend systems 118. In other implementations, the differential processing module 810 can be distributed among various backend systems and a serving system.

The differential processing module 810 may include and/or use one more data structures as well as one or more computational algorithms that may operate on various data. The module 810 may include one or more sets of instructions for performing various tasks, and it can output information for use by users or other systems. In some implementations, the module 810 may include one or more engines, which may output code (e.g., source code, HTML, etc.) that serves as input to other systems, engines or processes.

The module 810 may be implemented using various programming or other languages suitable for controlling behavior of a system. In some examples, the module 810 may be implemented using one or more of C/C++, Java, Visual Basic, eXtendible Markup Language (XML), HTML and other languages.

Although depicted within software application layers 724, the differential processing module 810 could include and/or be coupled to various hardware elements (within or external to the data processing system(s)). For example, the module 810 could include one or more neural networks, which may employ software and hardware processing elements or agents linked together. In some examples, the module 810 could include or use one more embedded systems, such as microcontrollers, routers, etc.

The differential processing module 810 may be configured to perform differential threshold and/or differential bidding functionality consistent with FIGS. 3-5, 6A and 6B above. The differential processing module 810 can (independently or in conjunction with other systems and modules) select a stored threshold value representing a minimum price for activating content based on a particular rendering characteristic.

In addition, the module 810 can determine whether a bid associated with an identified ad causes the ad to satisfy a selected threshold value. In some implementations, the differential processing module 810 can determine one or more characteristics of how a particular advertisement is to be rendered in a publisher site. In some implementations, the module 810 (independently or in conjunction with other systems and modules) may perform aspects of the processes 300, 400, 500 and/or 600. The differential processing module 810 may be configured with executable instructions that perform aspects of the processes.

FIG. 9 is a block diagram of an example configuration 900 for a user access device, such as the user access device 108. The number, identity, and arrangement of elements in the configuration 900 are not limited to what is shown, and additional and/or different elements may be contained in or coupled to the elements shown. The configuration 900 is an example only, and the user access device 108 could be configured in other ways.

In the example configuration 900, the user access devices 108 may include various components, such as a network interface 902, a processor 904, an output 906, an input 908, interfaces 910, and a storage 912, which may maintain an application layer 914. The components illustrated in FIG. 9 (i.e., 902, 904, 906, 908, 910, 912, and 914) may be similar in structure and functionality to those components described in connection with FIG. 7 (i.e., 712, 714, 716, 718, 720, 722, and 724). In some implementations, however, one or more of the user access devices 108 may include components that are structurally and functionally different from those described in connection with FIG. 7. For example, the user access devices 108 may be configured with different (e.g., less) storage capacity and different application layers than the system 710. In some examples, the application layer 914 in a user access device may include one or more modules configured to present various viewers (e.g., browsers) to users. The application layer 914 may also include one or more modules for interacting with other elements (e.g., data processing systems 112, 114, and/or 116), receiving and processing ads, and/or combining received ads with received content for presentation to users.

The user access devices 108 could also be configured with less or different processing capabilities than that of the system 710. In some examples, the user access devices 108 may include various user interface components (e.g., keypads, display devices, speakers, microphones, etc.) while the server system may lack such (or even any) user interface components. In some examples, the system 710 could be a general purpose server while the user access devices 108 could include embedded systems optimized with specific components for performing specific tasks.

Although the above description refers to a content item such as an advertisement, content items such as video and/or audio files, web pages for particular subjects, news articles, etc. can also be used.

The foregoing description does not represent an exhaustive list of all possible implementations consistent with this disclosure or of all possible variations of the implementations described. Other implementations are within the scope of the following claims.

What is claimed is:

1. A computer-implemented method of providing content, comprising:
  receiving, by one or more computers, a request for a content item to be presented in an advertisement block of a web property of a publisher, the request including web property characteristics with which a content item is selected in response to the request;

determining, by the one or more computers, a minimum price that is required by the publisher for presentation of a content item in the advertising block;

selecting, by the one or more computers, a responsive content item from among multiple content items, the responsive content item being selected based on the characteristics of the web property and targeting criteria for the responsive content item;

determining, by the one or more computers, that the selected responsive content item has two dynamically selectable presentation formats;

identifying, by the one or more computers, a separate bid for each of the dynamically selectable presentation formats, the separate bid for each presentation format specifying a different maximum amount that will be paid for distribution of the responsive content item when formatted according to the presentation format;

selecting, from the two dynamically selectable presentation formats and by the one or more computers, a presentation format for the responsive content item, the separate bid for the selected presentation format having a value that meets the minimum price; and providing, in response to the request, data that causes presentation of the responsive content item according to the selected presentation format.

2. The method of claim 1, wherein:

receiving a request for a content item comprises receiving a request for an advertisement, the request specifying:
  a first minimum price required to present multiple advertisements in the advertisement block; and
  a second minimum price required to present only a single advertisement in the advertisement block; and selecting a presentation format for a responsive content item comprises:
  determining that the separate bid for at least one of the dynamically selectable presentation formats meets the first minimum price or the second minimum price; and
  selecting the presentation format based on the separate bid for the at least one dynamically selectable presentation format, the responsive content item being a responsive advertisement.

3. The method of claim 2, wherein:

identifying a separate bid for each of the dynamically selectable presentation formats comprises:
  identifying a first bid specifying a maximum price that an advertiser will pay for presentation of an advertisement at a first presentation size, the first presentation size being a presentation size that enables presentation of at least two advertisements in the advertisement block; and
  identifying a second bid specifying a maximum price that the advertiser will pay for presentation of the advertisement at a second presentation size, the second presentation size being a presentation size at which only one advertisement is presentable in the advertisement block;

determining that the separate bid for at least one of the dynamically selectable presentation formats meets the first minimum price or the second minimum price comprises determining that the first bid meets the first minimum price or that the second bid meets the second minimum price; and selecting the presentation format comprises:
  selecting the second presentation size in response to determining that the second bid meets the second minimum price; and
  selecting the first presentation size in response to determining that the second bid does not meet the second minimum price.

4. The method of claim 1, wherein receiving a request for a content item comprises receiving a request for advertisements.

5. The method of claim 1, wherein providing data that causes presentation of the responsive content item comprises providing the responsive content item for presentation with a webpage.

6. A computer-implemented method of providing content, comprising:

receiving, by one or more computers, a request for a content item to be presented in an advertisement block of a web property of a publisher, the request including web property characteristics with which a content item is selected in response to the request;

identifying, by the one or more computers and based on the characteristics in the received request and targeting criteria for content items, a first content item to be presented in the advertisement block;

accessing, by the one or more computers, a stored bid associated with the identified first content item, the stored bid representing a base maximum price to be paid for presentation of the first content item in the advertisement block;

determining, by the one or more computers, that the first content item is to be presented in the advertisement block according to one of two dynamically selectable presentation formats, each of the dynamically selectable presentation formats having a different bid multiplier;

selecting, by the one or more computers, a different stored pricing threshold value for each of the dynamically selectable presentation formats, the different stored pricing threshold for each of the dynamically selectable presentation formats specifying a different minimum bid value that is required by the publisher for the first content item to be presented according to the dynamically selectable presentation format;

for each of the dynamically selectable presentation formats:
  determining a bid value based on the bid and the bid multiplier for the dynamically selectable presentation format; and
  determining whether the bid value satisfies the selected pricing threshold value for the dynamically selectable presentation formats; and selecting, by the one or more computers, a presentation format for the first content item, the selected presentation format being one of the two dynamically selectable presentation formats for which the bid value satisfied the pricing threshold; and upon determining that the identified first content item satisfies the selected pricing threshold value, providing data that causes presentation of the first content item in the advertisement block according to the selected presentation format.

7. The method of claim 6, wherein the different bid multiplier for each of the dynamically selectable presentation formats has a value that is proportional to an amount of available space that is occupied by the first content item when the first content item is presented according to the dynamically selectable presentation format.

8. The method of claim 6, wherein receiving a request for a content item comprises receiving a request for an advertisement.

9. The method of claim 8, wherein identifying a first content item to be presented in the advertisement block comprises identifying advertisements to be rendered in a webpage.

10. The method of claim 6, wherein providing data that causes presentation of the first content item comprises providing the first content item for rendering in a webpage.

11. A system comprising:
a processor; and
memory, coupled to the processor, including executable instructions for performing operations comprising:
receiving a request for a content item to be presented in an advertisement block of a web property of a publisher, the request including web property characteristics with which a content item is selected in response to the request;
determining a minimum price that is required by the publisher for presentation of a content item in the advertising block;
selecting a responsive content item from among multiple content items, the responsive content item being selected based on the characteristics of the web property and targeting criteria for the responsive content item;
determining that the selected responsive content item has two dynamically selectable presentation formats;
identifying a separate bid for each of the dynamically selectable presentation formats, the separate bid for each presentation format specifying a different maximum amount that will be paid for distribution of the responsive content item when formatted according to the presentation format;
selecting, from the two dynamically selectable presentation formats, a presentation format for the responsive content item, the separate bid for the selected presentation format having a value that meets the minimum price; and
providing, in response to the request, data that causes presentation of the responsive content item according to the selected presentation format.

12. The system of claim 11, wherein:
receiving a request for a content item comprises receiving a request for an advertisement, the request specifying:
a first minimum price required to present multiple advertisements in the advertisement block; and
a second minimum price required to present only a single advertisement in the advertisement block; and
selecting a presentation format for a responsive content item comprises:
determining that the separate bid for at least one of the dynamically selectable presentation formats meets the first minimum price or the second minimum price; and
selecting the presentation format based on the separate bid for the at least one dynamically selectable presentation format, the responsive content item being a responsive advertisement.

13. The system of claim 12, wherein:
identifying a separate bid for each of the dynamically selectable presentation formats comprises:
identifying a first bid specifying a maximum price that an advertiser will pay for presentation of an advertisement at a first presentation size, the first presentation size being a presentation size that enables presentation of at least two advertisements in the advertisement block; and
identifying a second bid specifying a maximum price that the advertiser will pay for presentation of the advertisement at a second presentation size, the second presentation size being a presentation size at which only one advertisement is presentable in the advertisement block;
determining that the separate bid for at least one of the dynamically selectable presentation formats meets the first minimum price or the second minimum price comprises determining that the first bid meets the first minimum price or that the second bid meets the second minimum price; and
selecting the presentation format comprises:
selecting the second presentation size in response to determining that the second bid meets the second minimum price; and
selecting the first presentation size in response to determining that the second bid does not meet the second minimum price.

14. The system of claim 11, wherein receiving a request for a content item comprises receiving a request for advertisements.

15. The system of claim 11, wherein providing data that causes presentation of the responsive content item comprises providing the responsive content item for presentation with a webpage.

16. A computer readable medium storing a computer program, the computer program including instructions that, when executed, cause at least one processor to perform operations comprising:
receiving a request for a content item to be presented in an advertisement block of a web property of a publisher, the request including web property characteristics with which a content item is selected in response to the request;
identifying, based on the characteristics in the received request and targeting criteria for content items, a first content item to be presented in the advertisement block;
accessing a stored bid associated with the identified first content item, the stored bid representing a base maximum price to be paid for presentation of the first content item in the advertisement block;
determining that the first content item is to be presented in the advertisement block according to one of two dynamically selectable presentation formats, each of the dynamically selectable presentation formats having a different bid multiplier;
selecting a different stored pricing threshold value for each of the dynamically selectable presentation formats, the different stored pricing threshold for each of the dynamically selectable presentation formats specifying a different minimum bid value that is required by the publisher for the first content item to be presented according to the dynamically selectable presentation format;
for each of the dynamically selectable presentation formats:
determining a bid value based on the bid and the bid multiplier for the dynamically selectable presentation format; and
determining whether the bid value satisfies the selected pricing threshold value for the dynamically selectable presentation formats; and selecting a presentation format for the first content item, the selected presentation format being one of the two dynamically selectable presentation formats for which the bid value satisfied the pricing threshold; and upon determining that the identified first content item satisfies the selected pricing threshold value, providing data that causes presentation of the first content item in the advertisement block according to the selected presentation format.

17. The computer readable medium of claim 16, wherein the different bid multiplier for each of the dynamically selectable presentation formats has a value that is proportional to an amount of available space that is occupied by the first content item when the first content item is presented according to the dynamically selectable presentation format.

18. The computer readable medium of claim 16, wherein receiving a request for a content item comprises receiving a request for an advertisement.

19. The computer readable medium of claim 18, wherein identifying a first content item to be presented in the advertisement block comprises identifying advertisements to be rendered in a webpage.

20. The computer readable medium of claim 16, wherein providing data that causes presentation of the first content item comprises providing the first content item for rendering in a webpage.

21. A system, comprising:
a processor; and
memory, coupled to the processor, including executable instructions for performing operations comprising:
receiving a request for a content item to be presented in an advertisement block of a web property of a publisher, the request including web property characteristics with which a content item is selected in response to the request;
identifying, based on the characteristics in the received request and targeting criteria for content items, a first content item to be presented in the advertisement block;
accessing a stored bid associated with the identified first content item, the stored bid representing a base maximum price to be paid for presentation of the first content item in the advertisement block;
determining that the first content item is to be presented in the advertisement block according to one of two dynamically selectable presentation formats, each of the dynamically selectable presentation formats having a different bid multiplier;
selecting a different stored pricing threshold value for each of the dynamically selectable presentation formats, the different stored pricing threshold for each of the dynamically selectable presentation formats specifying a different minimum bid value that is required by the publisher for the first content item to be presented according to the dynamically selectable presentation format;
for each of the dynamically selectable presentation formats:
determining a bid value based on the bid and the bid multiplier for the dynamically selectable presentation format; and
determining whether the bid value satisfies the selected pricing threshold value for the dynamically selectable presentation formats; and selecting a presentation format for the first content item, the selected presentation format being one of the two dynamically selectable presentation formats for which the bid value satisfied the pricing threshold; and upon determining that the identified first content item satisfies the selected pricing threshold value, providing data that causes presentation of the first content item in the advertisement block according to the selected presentation format.

22. The system of claim 21, wherein the different bid multiplier for each of the dynamically selectable presentation formats has a value that is proportional to an amount of available space that is occupied by the first content item when the first content item is presented according to the dynamically selectable presentation format.

23. The system of claim 21, wherein receiving a request for a content item comprises receiving a request for an advertisement.

24. The system of claim 23, wherein identifying a first content item to be presented in the advertisement block comprises identifying advertisements to be rendered in a webpage.

25. The system of claim 21, wherein providing data that causes presentation of the first content item comprises providing the first content item for rendering in a webpage.

26. A computer-implemented method of providing content, comprising:
receiving, by one or more computers, a request for a content item to be presented in an advertisement block of a web property, the request including web property characteristics with which a content item is selected in response to the request, the advertisement block being a portion of the web property in which one or more content items are selectively presented;
selecting, by the one or more computers and for presentation in the advertisement block, a responsive content item that has two dynamically selectable presentation formats, each presentation format being based, at least in part, on a number of content items to be presented in the advertisement block;
identifying, by the one or more computers, a separate bid for each of the dynamically selectable presentation formats, the separate bid for each presentation format specifying a different maximum amount that will be paid for distribution of the responsive content item when formatted according to the presentation format;
determining, by the one or more computers, a number of content items that will be presented in the advertisement block based, at least in part, on the separate bids for each of the dynamically selectable presentation formats;
selecting, from the two dynamically selectable presentation formats and by the one or more computers, a presentation format for the responsive content item, the selected presentation format being selected based on the number of content items that will be presented in the advertisement block; and
providing, in response to the request, data that causes presentation of the responsive content item according to the selected presentation format.

* * * * *